(12) United States Patent
Kou et al.

(10) Patent No.: US 10,598,182 B2
(45) Date of Patent: Mar. 24, 2020

(54) VENTILATION APPARATUS WITH COUNTER-ROTATING IMPELLERS DRIVEN BY LONG SHAFT

(71) Applicant: TAIYUAN UNIVERSITY OF TECHNOLOGY, Shanxi (CN)

(72) Inventors: Ziming Kou, Taiyuan (CN); Juan Wu, Taiyuan (CN); Guijun Gao, Taiyuan (CN); Shanrong Da, Taiyuan (CN); Jing Zhang, Taiyuan (CN); Yanfei Kou, Taiyuan (CN); Ting Li, Taiyuan (CN); Sheng Li, Taiyuan (CN); Jin Wei, Taiyuan (CN)

(73) Assignee: TAIYUAN UNIVERSITY OF TECHNOLOGY, Shanxi (CN)

( * ) Notice: Subject to any disclaimer, the term of this patent is extended or adjusted under 35 U.S.C. 154(b) by 219 days.

(21) Appl. No.: 15/506,542

(22) PCT Filed: Nov. 19, 2015

(86) PCT No.: PCT/CN2015/000798
§ 371 (c)(1),
(2) Date: Feb. 24, 2017

(87) PCT Pub. No.: WO2016/197283
PCT Pub. Date: Dec. 15, 2016

(65) Prior Publication Data
US 2018/0080451 A1   Mar. 22, 2018

(30) Foreign Application Priority Data
Jun. 12, 2015   (CN) .......................... 2015 1 0323914

(51) Int. Cl.
*F04D 19/02* (2006.01)
*F04D 19/00* (2006.01)
(Continued)

(52) U.S. Cl.
CPC ......... *F04D 19/024* (2013.01); *F04D 19/007* (2013.01); *F04D 25/02* (2013.01);
(Continued)

(58) Field of Classification Search
CPC ...... F04D 19/024; F04D 25/08; F04D 25/163; F04D 25/02; E21F 1/00; B64C 27/10;
(Continued)

(56) References Cited

U.S. PATENT DOCUMENTS 84,764 A * 12/1868 Richardson ............... B60S 1/18
74/59
3,851,537 A * 12/1974 Nickstadt ................ F16H 1/222
74/404

(Continued)

*Primary Examiner* — Kenneth Bomberg
*Assistant Examiner* — Hakeem M Abdellaoui
(74) *Attorney, Agent, or Firm* — Morgan, Lewis & Bockius LLP

(57) ABSTRACT

There is provided a ventilation apparatus with counter-rotating impellers driven by long shaft, wherein an electric motor and a gearbox are placed outside the air duct by using a long shaft with an internally disposed slim shaft extending therefrom, and are connected with the first stage impeller and second stage impeller inside the air duct by using the long shaft and slim shaft extending therefrom. In this ventilation apparatus with counter-rotating impellers, the components of the ventilation apparatus are placed inside and outside the air duct respectively by using the transmission shaft, which is convenient for maintenance and operation. By remotely arranging the impellers at an axial distance, the hub of the impellers will no longer be affected by an internally disposed electric motor, so as to reduce the ventilation resistance to ventilation. The impellers can be switched between the single impeller rotation and the counter rotation of two impellers.

5 Claims, 3 Drawing Sheets

(51) Int. Cl.
*F04D 25/02* (2006.01)
*F04D 25/08* (2006.01)
*F04D 29/053* (2006.01)
*E21F 1/00* (2006.01)
*F04D 29/54* (2006.01)
*F16H 1/22* (2006.01)
*F16H 25/18* (2006.01)

(52) U.S. Cl.
CPC ........... *F04D 25/08* (2013.01); *F04D 29/053* (2013.01); *E21F 1/00* (2013.01); *F04D 29/545* (2013.01); *F16H 1/222* (2013.01); *F16H 25/186* (2013.01)

(58) Field of Classification Search
CPC .......... F16H 1/222; F16H 21/00; F16H 21/18; F16H 25/186; F16H 48/285; F16H 2025/063
USPC ..................................... 74/665 G, 321, 424.5
See application file for complete search history.

(56) References Cited

U.S. PATENT DOCUMENTS

| | | | | |
|---|---|---|---|---|
| 5,247,856 A | * | 9/1993 | Cuypers | B63H 5/10 74/665 F |
| 5,921,828 A | * | 7/1999 | Ogino | B63H 5/10 192/48.7 |
| 6,540,570 B1 | * | 4/2003 | Eakin | B63H 7/02 440/37 |
| 2007/0221011 A1 | * | 9/2007 | Wang | F16H 25/186 74/567 |
| 2007/0264122 A1 | * | 11/2007 | Iwasaki | F04D 19/007 416/120 |
| 2008/0038111 A1 | * | 2/2008 | Iwasaki | F04D 25/02 415/198.1 |
| 2010/0117013 A1 | * | 5/2010 | Laurent | F16H 25/186 251/77 |
| 2014/0318304 A1 | * | 10/2014 | Hahn | B62D 1/184 74/493 |
| 2016/0312866 A1 | * | 10/2016 | Zink | F16H 63/18 |
| 2019/0009803 A1 | * | 1/2019 | Pollard | B61D 1/00 |
| 2019/0118622 A1 | * | 4/2019 | Park | F24F 13/142 |

* cited by examiner

VENTILATION APPARATUS WITH COUNTER-ROTATING IMPELLERS DRIVEN BY LONG SHAFT

RELATED APPLICATIONS

This application is the U.S. national stage application of International (PCT) Patent Application Serial No. PCT/CN2015/000798, filed Nov. 19, 2015, which claims the benefit of Chinese Application No. 201510323914.6, filed Jun. 12, 2015. The entire disclosure of each of these applications is hereby incorporated by reference.

TECHNICAL FIELD

The invention relates to a ventilation apparatus with counter-rotating impellers, especially to a technical solution of a ventilation apparatus with counter-rotating impellers that is driven by a long shaft.

BACKGROUND

An appropriate ventilation system supplies each intended site with adequate fresh air, provides suitable temperature and humidity, maintains good air conditions using ventilation power in the most economical way, in order to ensure the safety of workers and improve the environment. The appropriate ventilation system features a simple structure and a suitably designed configuration for the purpose of safe production. The property of the ventilation apparatus has a very important influence on ventilation effect.

The majority of the existing ventilation apparatus with counter-rotating impellers adopts two stage impellers which are driven by two motors rotating in opposite directions, respectively. The main problems are as follows: 1) the motor and the impeller are directly coupled to each other and fixed inside the air duct, the heat dissipation of the motor in the air duct is worse as compared to that in the atmosphere, and it is inconvenient to repair the motor; and 2) in the small and medium-sized coal mines or in the early stage of the excavation for large tunnel, the requirement on ventilation pressure is relatively low, and thus the high pressure ventilation generated by the counter-rotating impellers can cause energy waste in this case. For example, publication No. CN101403389A discloses "a counter-rotating axial flow fan" including an electric motor, an air duct, two stage impellers, a gearbox and bevel gears. The motor drive is disposed inside the air duct. The counter rotation of the two stage impellers is achieved by the driving of the bevel gears in the gearbox. The arrangement of the gearbox inside the air duct causes the inconvenience of maintenance and operation of the apparatus and constraints the axial distance between the two stage impellers, and hence is not suitable for the counter rotating type of ventilation apparatus requiring a compact structure.

A prior art involving an external motor is for example disclosed in publication No. CN2777255 relating to "a counter-rotating type of axial flow ventilator with external motor" including two motors, a long shaft, two stage impellers and diffusers. The two motors are placed outside the air duct and drive the two stage impellers respectively through the transmission of the long shaft connected thereto. The system powered by two motors will occupy a larger floor area as compared to that powered by a single motor, and thus is inconvenient to operate.

As a further example, publication No. CN2793377 discloses "a two-stage counter-rotating axial flow fan" which comprises a motor, a universal coupler, a fairing, two stage impellers, a gear transmission mechanism with dual output shafts and a diffuser. In operation, the motor drives the gear transmission mechanism with dual output shafts through the universal coupler, and the mechanism in turn drives the two stage impellers to rotate reversely. When only a small ventilation pressure is required, the high pressure produced by the ventilation apparatus with counter-rotating impellers due to the synchronous rotation of the two impellers will cause a great energy waste.

Therefore, it is very important to develop a ventilation apparatus with counter-rotating impellers driven by long shaft that has a more compact structure, is easy for maintenance and operation and is switchable between single impeller rotation and counter rotation of two impellers to save energy.

SUMMARY OF THE INVENTION

The particular technical problems to be solved by the present invention are to improve the existing counter rotating ventilation with poor heat dissipation and difficult maintenance, to switch the working state of the impellers from single impeller rotation to counter rotation or vice versa with the ventilation pressure requirement being met so as to reduce energy consumption, and to provide a ventilation apparatus with counter-rotating impellers driven by the long shaft.

There is provided a ventilation apparatus with counter-rotating impellers driven by long shaft including an electric motor, a gearbox, a transmission shaft, a first stage impeller and a second stage impeller, characterized in that:

the electric motor and gearbox are placed outside the air duct by using the transmission shaft extending therefrom;

the first stage impeller and second stage impeller are placed inside the air duct by using the transmission shaft extending therefrom;

the transmission shaft is composed of a long shaft and a slim shaft arranged therein, and the long shaft and the slim shaft are connected with the gearbox at one end, and are respectively connected with the second stage impeller and the first stage impeller at the other end;

in the gearbox is provided a cross shaft which is mounted with a driven bevel gear in the longitudinal direction and is provided with the slim shaft passing therethrough in the transverse direction, and is further provided with a compression spring and a driving bevel gear adjacent the slim shaft in longitudinal direction; a gear shaft in the gearbox is connected with the long shaft through fan-blade flange; the body of the gearbox is connected to a lateral flange which is sequentially provided with a engaging surface for gear sector, a moveable end-cam and a stationary end-cam at one side, and an operating handle at the other side.

Based on the above mentioned technical solution, in the invention, the first stage impeller and second stage impeller are designed to have a diameter of 800 mm, the motor is designed to have a rated power of 55 kW×2 and a speed of revolution of 2970 rpm, and the gearbox is designed to have a transmission ratio of 1:1.

The ventilation apparatus with counter-rotating impellers according to the invention is used in the ventilation environment in which the ventilation volume is 540 to 900 $m^3$/min, the ventilation pressure is 8600 to 1500 Pa, and the air density is 1.20 kg/$m^3$. Under the standard operating condition of the ventilation apparatus with counter-rotating impellers, the ventilation volume is 790 $m^3$/min, and the ventilation pressure is 6000 Pa.

In said technical solution, the engagement and disengagement between the movable end-cam and the stationary end-cam is controlled by means of the operating handle outside of the gearbox body.

In said technical solution, the engagement and disengagement between the moveable end-cam and the stationary end-cam can be realized by means of the control via the operating handle outside of the gearbox. When the movable end-cam and stationary end-cam engage, the compression spring is in a relaxed state, the bevel gear on the longitudinal extension of the cross shaft is disengaged, the transmission chain is disconnected, and the slim shaft rotates the first stage impeller; when the movable end-cam and the stationary end-cam disengage, the compression spring is in a compressed state, the bevel gear is engaged, the gearbox performs the reversing of rotation, the slim shaft and long shaft drives the first stage impeller and the second stage impeller respectively to conduct counter rotation of the two impellers. The cross shaft is provided with tapered roller bearings at both longitudinal ends of. By using the tapered roller bearings which can withstand high-speed operation, the requirement on high speed rotation of the impellers will be met.

By implementing the ventilation apparatus with counter-rotating impellers driven by the long shaft according to the invention, the problems of the existing ventilation apparatus with counter-rotating impellers such as poor performance and poor heat dissipation can be solved. The long shaft drive and gearbox is easy for maintenance and operation when being arranged outside of the air duct. Arranging the impellers within the air duct in the axial direction will cause the structure to be more compact and the hub of the impellers not to be affected by an internally disposed motor so as to reduce the resistance to ventilation. The impellers can be switched between single impeller rotation and counter rotation of two impellers while meeting the requirement on ventilation pressure, which will further reduce energy consumption. As such, the ventilation apparatus with counter-rotating impellers has a good energy saving effect.

In these figures: 1—electric motor; 2—coupler; 3—gearbox; 4—air duct; 5—long shaft; 6—second stage impeller; 7—first stage impeller; 8—compression spring; 9—tapered roller bearings, 10—cross shaft; 11—driven bevel gear; 12—driving bevel gear; 13—gearbox cover; 14—slim shaft; 15—diffusion tube; 16—cylindrical roller bearing; 17—round nuts; 18—collector; 19—stationary end-cam; 20—moveable end-cam; 21—engaging surface for gear sector; 22—operating handle.

DETAILED DESCRIPTION TO THE EMBODIMENTS

Hereinafter the specific embodiments of the present invention will be further discussed in detail in connection with accompanying drawings, to the extent that the skilled person in the art is enabled to implement it.

Figure 1:
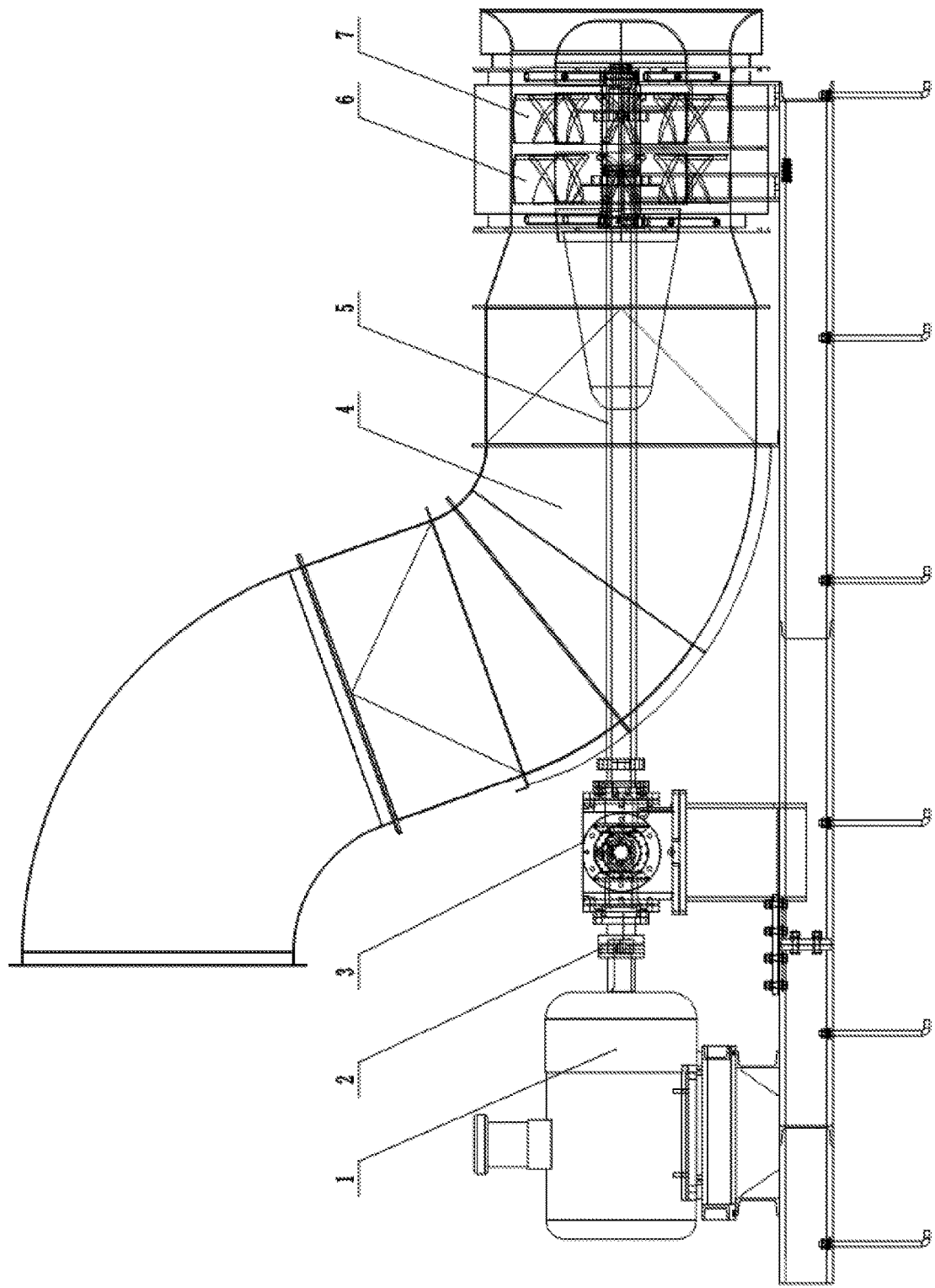
FIG. 1 is the schematic diagram of the overall structure of the invention.

As shown in FIG. 1, a ventilation apparatus with counter-rotating impellers driven by a long shaft according to an embodiment of the invention is powered by an electric motor 1. The power is transferred to the gearbox 3 through a coupler 2. By means of the operation of the gearbox 3, the impellers are driven to perform either single impeller rotation or counter rotation of two impellers, which facilitates the ventilation via the rotation of counter-rotating impellers driven by the long shaft.

Figure 2:
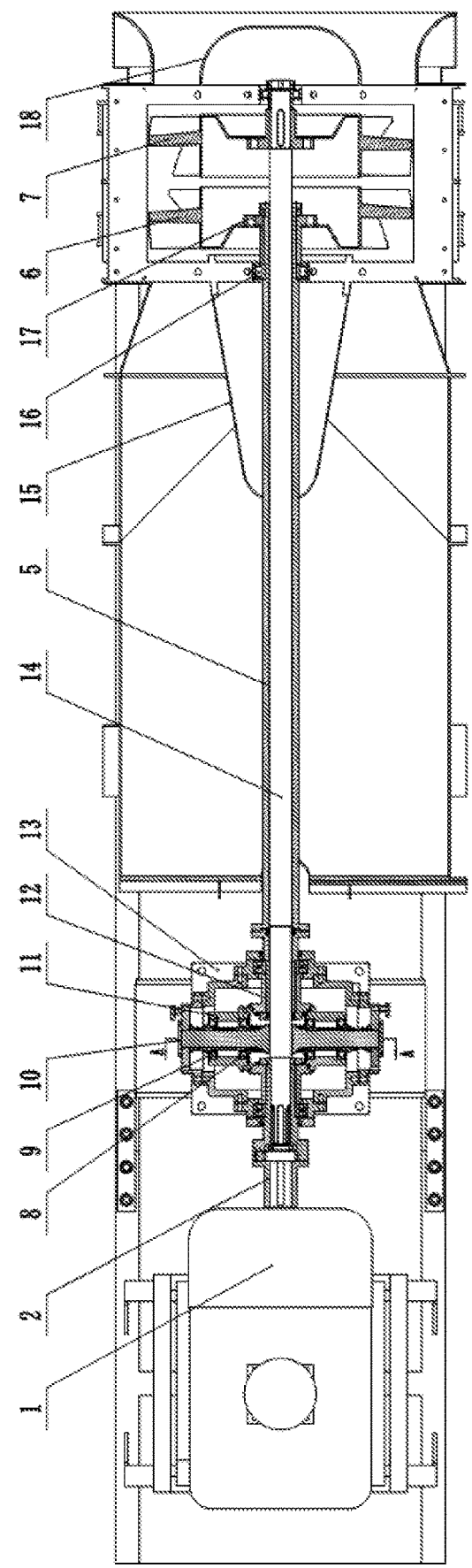
FIG. 2 is the schematic diagram of the top view of the invention in FIG. 1.
Figure 3:
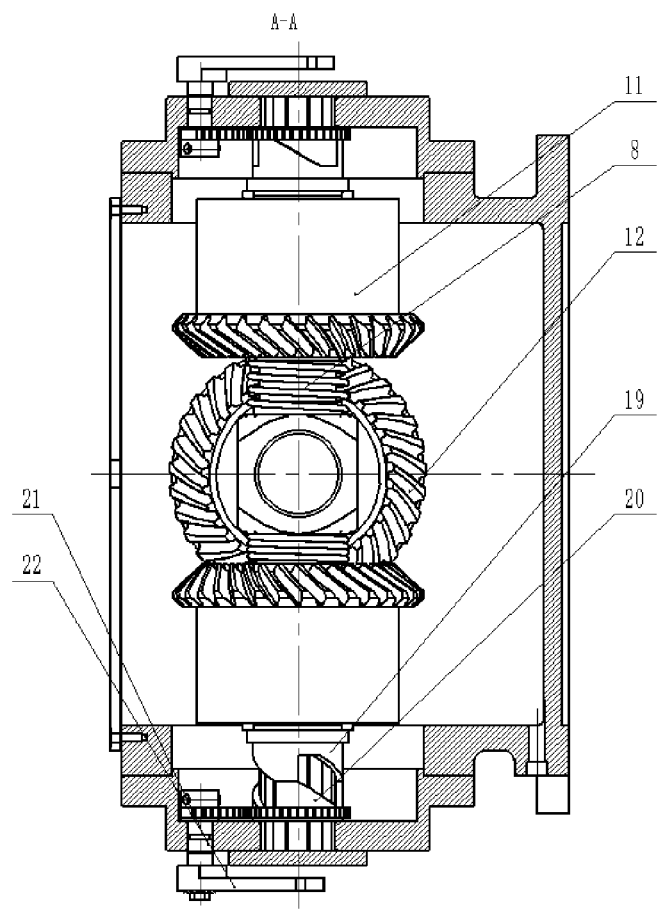
FIG. 3 is the sectional view of the structure of the invention taken along the line A-A in FIG. 2.
Figure 4:
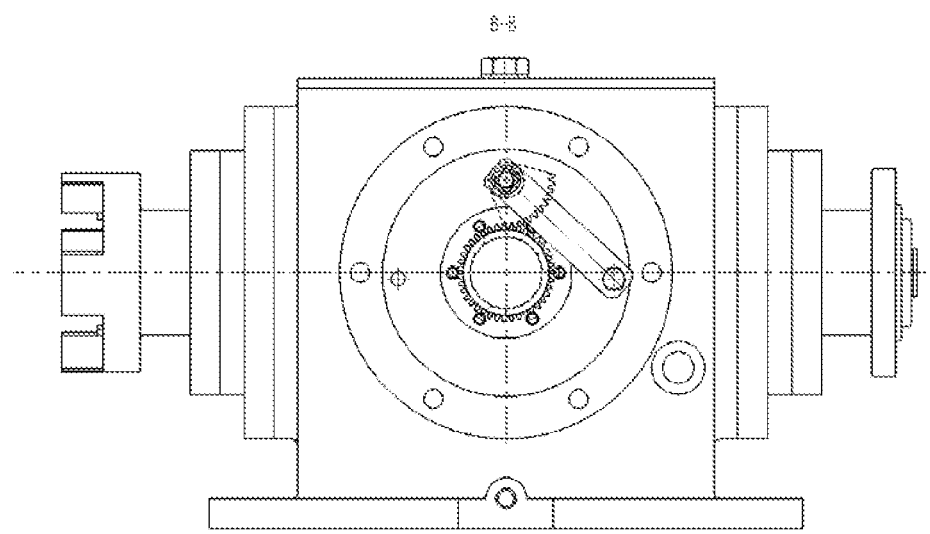
FIG. 4 is the sectional view of the structure of invention taken along the line B-B in FIG. 2.

As shown in FIGS. 2, 3 and 4, the ventilation apparatus with counter-rotating impellers driven by the long shaft mainly includes an electric motor 1, a gearbox 3, a first stage impeller 7, a second stage impeller 6 and transmission shafts. In the apparatus, the electric motor 1 is coupled to the gearbox 3 through the coupler 2, and is disposed at a properly designed position outside the air duct 4 by using a transmission shaft extending therefrom, so as to facilitate operation and maintenance. By using the transmission shaft, the first stage impeller 7 and the second stage impeller 6 are arranged at properly designed positions within the air duct 4. The hub of the impellers will no longer be affected by an internally disposed motor, the resistance to airflow will be reduced and the structure will be more compact.

The transmission shaft is designed as a long shaft 5 with a slim shaft 14 nested therein, and the long shaft 5 and slim shaft 14 are connected at one end to the second stage impeller 6 and the first stage impeller 7 respectively to perform counter rotation, so as to achieve the ventilation via the counter-rotating impellers.

The gearbox 3 is provided with a cross shaft 10. The cross shaft 10 is mounted with a driven bevel gear 11 in the longitudinal direction and is provided with the slim shaft 14 passing therethrough in the transverse direction, and is further provided with a compression spring 8 and a driving bevel gear 12 adjacent the slim shaft in the longitudinal direction. A gear shaft in the gearbox 3 is connected to the long shaft through a fan-blade flange.

The body of the gearbox 3 is connected with a lateral flange which is sequentially provided with an engaging surface for gear sector 21, a moveable end-cam 20 and a stationary end-cam 19 at one side, and an operating handle 22 at the other side. The engagement and disengagement of the moveable end-cam 20 with the stationary end-cam 19 are controlled by means of the operating handle 22 outside of the gearbox 3.

In this embodiment of the invention, the first stage impeller 7 and the second stage impeller 6 are designed to have the same diameter of 800 mm, and they can be designed to have different diameters depending on the particular condition of ventilation and energy saving. In an experiment, the first stage impeller having a diameter of 1000 mm and the second stage impeller having a diameter of 800 mm have been tested, and it results a larger ventilation volume and a more significant energy saving. In a further experiment under small ventilation pressure, the first stage impeller 7 is designed as having a diameter of 800 mm, the second stage impeller 6 having a diameter of 600 mm, and it also results a good energy saving. In the above-mentioned three designs, the electric motor 1 is selected to have a rated power of 55 kW×2 and a speed of revolution of 2970 rpm, the gearbox is selected to have a transmission ratio of 1:1.

When the first stage impeller 7 and second stage impeller 6 are designed to have the same diameter of 800 mm, the ventilation apparatus with counter-rotating impellers is used in the ventilation environment in which the ventilation volume is 540 to 900 $m^3$/min, the ventilation pressure is 8600 to 1500 Pa, and the air density is 1.20 kg/$m^3$. If the counter-rotating impellers ventilates at a standard operating condition, the ventilation volume thereof is designed as 790 m³/min, and the ventilation pressure thereof is 6000 Pa. Also, the corresponding ventilation volume of the counter-rotating impellers can be calculated according to the diameters of the first stage impeller 7 and second stage impeller 6.

In the technical solution of the said embodiment, the engagement and disengagement between the moveable end-cam 20 and the stationary end-cam 19 can be realized by means of the control via the operating handle 22 outside of the gearbox. When the movable end-cam 20 and stationary end-cam 19 engage, the compression spring 8 is in a relaxed state, the bevel gear on the longitudinal extension of the cross shaft 10 is disengaged, the transmission chain is disconnected, and the slim shaft 14 rotates the first stage impeller 7; when the movable end-cam 20 and the stationary end-cam 19 disengage, the compression spring 8 is in a compressed state, the bevel gear is engaged, the gearbox 3 performs the reversing of rotation, the slim shaft 14 and long shaft 5 drives the first stage impeller 7 and the second stage impeller 6 respectively to conduct counter rotation of the two impellers. In the figure, the compression springs at both sides of the gear box are differently depicted to show their two different states, i.e. the compressed state and relaxed state. However, in the actual operation, the states of these compression springs at both sides are synchronous.

The cross shaft is provided with tapered roller bearings 9 at both longitudinal ends, and the structure of the tapered roller bearings can withstand high-speed operation in order to meet the requirements on high-speed operation of the impellers.

In operation, when the power supply is switched on, the motor 1 is activated and drives the gearbox 3 though the coupler 2. By means of the operating handle 22, the movable end-cam 20 is engaged with the stationary end-cam 19, and the transmission shaft drives the first stage impeller 7 and second stage impeller 6 to perform counter rotation, which produces a larger ventilation volume. When the movable end-cam 20 is disengaged with the stationary end-cam 19 by means of the operating handle 22, the transmission shaft only rotates the first stage impeller 7, which produces a smaller ventilation volume. Alternatively, the apparatus can be controlled by a computer to alternate the two working states regularly, which can save electric power and achieve the goals of energy saving and emission reducing.

Through implementing the technical solution of the invention, the experimental results show that the performance of the ventilation apparatus has been further improved. The motor and the gearbox are easy for heat dissipation, maintenance and operation when being arranged outside the air duct. When the impellers are arranged inside the air duct in the axial direction, compared with the prior art, the hub of the impellers will not be affected by a internally disposed motor, and the resistance to ventilation pressure will be further reduced. Especially in some small and medium-sized coal mines or in the early stage of large tunnel excavation, the requirement on ventilation pressure is relatively low, and the impellers can be switched between the single impeller rotation and the counter rotation of two impellers while fulfilling the requirement on ventilation pressure, which will greatly reduce the energy consumption during the continuous ventilation in the coal mines. As such, the ventilation apparatus with counter-rotating impellers will achieve a better energy-saving effect.

EXAMPLES

For a coal mine which is mainly mined in the method of fully mechanized mining, the heading distance to the heading face is set as 2000 m, the section of the roadway is about 24.05 m², and the ground elevation of the working face is +1064 m. In this case, the area of working surface of fully mechanized excavation and the need for ventilation volume are relatively large. Considering the actual situation in site, said model of ventilation system with counter-rotating impellers is selected for ventilation supply, together with the flexible air duct having the diameter of 800 mm. After the installation and tuning up of the ventilation apparatus, said model of the ventilation system with counter-rotating impellers has been successfully applied.

In order to test the ventilation effect of the ventilation apparatus, the energy saving effect at the worksite of excavation is analyzed. Each ventilation system with counter-rotating impellers can save electricity worth about 190 thousand RMB per year, calculated on the basis of local electricity price 0.7 RMB/(kWh), and thus achieves a significant energy saving. Because of the improvement to the ventilation apparatus with counter-rotating impellers, the tearing apart of the air duct caused by excessive ventilation volume can be avoid, the labor intensity and the cost for the apparatus are reduced.

The invention claimed is:

1. A ventilation apparatus with counter-rotating impellers driven by a long shaft including a motor, a gearbox having a gear shaft, a transmission shaft, a first-stage impeller and a second-stage impeller, characterized in that, the motor (1) and the transmission gear box (3) are disposed outside an air duct (4) and coupled to the transmission shaft extending therefrom;

in the gearbox (3) is a cross shaft (10) which is mounted with a driven bevel gear (11) in the longitudinal direction;

the gearbox (3) has a slim shaft (14) passing therethrough in the transverse direction, and further comprises a compression spring (8) and a driving bevel gear (12) adjacent the slim shaft (14) in the longitudinal direction;

the gear shaft of the gearbox (3) is connected with the long shaft (5) through the fan-blade flange;

a body of the gearbox (3) is connected to a lateral flange which comprises, sequentially, an engaging surface for a gear sector (21), a movable end-cam (20) and a stationary end-cam (19) at one side, and an operating handle (22) at the other side;

the transmission shaft is composed of the long shaft (5) and the slim shaft (14) disposed therein, and the long shaft (5) and the slim shaft (14) are connected with the gearbox (3) at one end, and are connected with the second stage impeller (6) and the first stage impeller (7) respectively at the other end for counter rotation; and the first stage impeller (7) and the second stage impeller (6) are placed inside the air duct (4) and coupled to the transmission shaft extending therefrom, and no motor or any other component affecting the disturbance of air flow is disposed between the two impellers.

2. The ventilation apparatus with counter-rotating impellers driven by long shaft according to claim 1, characterized in that, engagement and disengagement between the movable end-cam (20) and the stationary end-cam (19) are controlled by means of operation handles (22) outside the body of the gearbox (3); and when the movable end-cam (20) engages with the stationary end-cam (19), a transmission chain is disconnected, and the slim shaft rotates the first stage impeller, to operate and ventilate with a single impeller; and when the movable end-cam (20) disengages with the stationary end-cam (19), the transmission chain is connected, and the gear box reverses the rotation, to counter rotate the first stage impeller and the second state impeller.

3. The ventilation apparatus with counter-rotating impellers driven by long shaft according to claim 1, characterized in that, the first stage impeller (7) and the second stage impeller (6) have a diameter of 800 mm, the motor (1) has a rated power of 55 kW×2 and a speed of revolution of 2970 rpm, and the gearbox (3) has a transmission ratio of 1:1.

4. The ventilation apparatus with counter-rotating impellers driven by long shaft according to claim 2, characterized in that, the ventilation apparatus with counter-rotating impellers is used in a ventilation environment in which a ventilation volume is 540 to 900 m$^3$/min, a ventilation pressure is 8600 to 1500 Pa, and an air density is 1.20 kg/m$^3$.

5. The ventilation apparatus with counter-rotating impellers driven by long shaft according to the claim 3, characterized in that, under a standard operating condition of the ventilation apparatus with counter-rotating impellers in which a ventilation volume is 540 to 900 m$^3$/min, a ventilation pressure is 8600 to 1500 Pa, and an air density is 1.20 kg/m$^3$, a ventilation volume is 790 m$^3$/min, and a ventilation pressure is 6000 Pa.

* * * * *